United States Patent [19]
Nakamura et al.

[11] 3,754,454
[45] Aug. 28, 1973

[54] SAFETY APPARATUS FOR SHUTTER BUTTON IN CAMERA

[75] Inventors: Hiroshi Nakamura, Sakai; Akio Okamoto, Osaka, both of Japan

[73] Assignee: Minolta Camera Kabushiki Kaisha, Osaka, Japan

[22] Filed: Jan. 12, 1973

[21] Appl. No.: 323,016

[52] U.S. Cl. ............ 95/31 R, 95/31 AC, 95/31 FL
[51] Int. Cl. ...................... G03b 17/42, G03b 19/04
[58] Field of Search ............ 95/31 R, 31 AC, 31 FL

[56] References Cited
UNITED STATES PATENTS
2,231,731  2/1941  Mihalyi .......................... 95/31 AC
3,633,480  1/1972  Kondo ............................. 95/31 AC Primary Examiner—Robert P. Greiner
Attorney—John C. Holman, Stanley Wolder et al.

[57] ABSTRACT

An apparatus comprising a rotary member rotatable in operative relation to a film winding operation, a driven member supported on the rotary member and rotatable with respect to the rotary member within a limited range, a release member downwardly movable by a shutter release operation and an engageable member urged toward the driven member by the winding operation but adapted to be urged toward the release member when the shutter is released. The engageable member has a portion engageable in and disengageable from a transport lock notch in the driven member and another portion engageable in and disengageable from a release lock portion of the release member, the engageable member being disposed with at least one of the engageable and disengageable portions engaged in the notch or the release lock portion. The apparatus further includes means for braking the driven member at least from an intermediate stage of the winding operation until the completion of the winding operation and means for retaining the driven member at its overcocked position upon the driven member reaching this position and permitting the rotary member to rotate reversely by the overcocked amount.

6 Claims, 17 Drawing Figures

SAFETY APPARATUS FOR SHUTTER BUTTON IN CAMERA

BACKGROUND OF THE INVENTION

This invention relates to a safety apparatus for shutter button in cameras, more particularly to improvements in a shutter button safety apparatus for preventing inadvertent depression of the shutter button unless the film is wound up.

With this type of camera, the shutter is cocked simultaneously with film transport to render the shutter releasable and the completion of an exposure by shutter release makes it possible to wind up the film when the camera operates normally. However, the film transport lock and shutter button lock in the conventional camera of this type have the drawback that the shutter is releasable immediately before the completion of film transport or, even where the shutter is unreleasable before the completion of film transport, the film can be wound up with the shutter button in its depressed position, with the result that the shutter can not be cocked although the film will be wound up.

To overcome such problem, a device has already been provided as disclosed in Japanese Utility Model Publication No. 8461/1970 by N. Sakai. The drawback of the conventional device has been overcome by the proposed device which includes, as fragmentarily shown in FIG. 1, a disc $a$ rotatably mounted on a winding shaft $b$ and a disc $c$ fixed to the shaft $b$, the disc $a$ and the disc $c$ being associated with each other by means of a pin $d$ and a notch $e$ with a given amount of play provided in the direction of rotation. A spring $f$ acts on the discs $a$ and $c$ to urge the disc $a$ in one direction. The discs $a$ and $c$ are formed with transport lock notches $g$ and $h$ respectively, the notch $h$ in the disc $c$ being circumferentially greater than the notch $g$ in the disc $a$ by the amount of the play, the construction being such that when one edge of the notch $e$ in the circumferential direction is in contact with the pin $d$ under the action of the spring $f$ as seen in the drawing, one end of the notch $g$ is in registry with that of the notch $h$ with respect to the circumferential direction. When the winding shaft $b$ is rotated in a clockwise direction by a film winding operation, the disc $a$ rotates therewith and, before the completion of the film winding operation, unillustrated means completely cocks the shutter. Film transport is completed in an overcocked state, whereupon a lug 'm of an engageable member $k$ for transport lock engages in the transport lock notches $g$ and $h$ whose end edges are in registry at one side so as to lock the transport. If the winding lever is then relieved of the operating force, the winding shaft $b$ and the disc $c$ rotate reversely in a counterclockwise direction by the amount of the aforementioned play. The engageable member $k$ has a lock portion $q$ engageable in a notch $p$ at the lower end of a release member $n$ and, while the lug $m$ is out of engagement with the notches $g$ and $h$, the lock portion $q$ engages in the notch $p$ of the release member $m$ to prevent the downward movement of the release member $n$ and thereby avoid inadvertent shutter release. The shutter is rendered releasable only when the lug $m$ engages in the notches $g$ and $h$, with the lock portion $q$ disengaged from the notch $p$ of the release member $n$. Accordingly, unless the film is completely wound up, the shutter is unreleasable and unless the lug $m$ is disengaged from the notches $g$ and $h$ after shutter release, the film can not be wound up.

Figure 1:
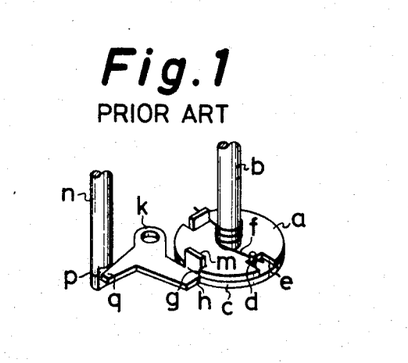
FIG. 1 is a perspective view showing the construction of principal part of shutter button safety device heretofore known.

When taking a photograph with a camera incorporating such device using a self-timer, the photographer may accidentally actuate the self-timer before he winds up the film. In such situation, a depressing force will act on the shutter release member and the lock portion $q$ of the engageable member $k$ engaged in the notch $p$ will be pressed on by the end face of the notch $p$. If the film is then wound up, with the engageable member $k$ thus arrested by the release member, the engageable member $k$ will be prevented from counterclockwise rotation at the aforementioned overcocked position, with the result that the lug $m$ cannot engage in the notches $g$ and $h$. If the winding lever is then relieved of the operating force, the disc $a$ will follow the counterclockwise rotation of the disc $c$ by the amount corresponding to the aforesaid amount of play, so that the notch $g$ of the disc $a$ will be deviated from the path of movement of the lug $m$. Consequently, even if the release member $n$ is relieved of the depressing force to free the lock portion $q$ from the pressing engagement, the lug $m$ will hit the outer periphery of the disc $a$ without being permitted to rotate further counterclockwise. Thus the lock portion $q$ is unable to disengage from the notch $p$ of the release member $n$. To sum up, if the film is wound up with the release member (shutter button) in its depressed position, the shutter becomes unreleasable in spite of the completion of shutter cocking operation and film transport.

SUMMARY OF THE INVENTION

An object of this invention is to eliminate all the drawbacks of the conventional device described and to provide an improved shutter button safety apparatus by which even when the film has been wound up with a lock member for preventing inadvertent depression of a release member already arrested against action by the release member, a normal shutter release operation can be effected by relieving the release member of the depressing force.

Another object of this invention is to provide an improved apparatus of the type described which is simplified in its construction to the greatest possible extent and which can be manufactured at a reduced cost.

To fulfil these objects, the apparatus of this invention comprises a rotary member rotatable in operative relation to a film winding operation, a driven member supported coaxially with the rotary member and rotatable with respect to the rotary member within a range limited by the rotary member, the driven member further being rotatable to follow the rotary member in the course of the winding operation, a release member downwardly movable by a shutter release operation and an engageable member so urged as to pivotally move toward the driven member in operative relation to the winding operation but adapted to be urged for pivotal movement toward the release member when the shutter is released, the engageable member having a portion engageable in and disengageable from a transport lock notch in the driven member and another portion engageable in and disengageable from a release lock portion of the release member, the engageable member being disposed with at least one of the engageable and disengageable portions engaged in the notch or the release lock portion. The apparatus further includes means for braking the driven member at least from an intermediate stage of the winding operation until the completion of the winding operation and means for retaining the driven member at its overcocked position upon the driven member reaching this position during the winding operation so as to prevent the driven member from reverse rotation even when the winding force is removed. Thus, even when the engageable member is pressed on at its one engageable portion by the release lock portion of the release member and is thereby rendered inoperative, the engageable portion can be disengaged from the release lock portion by the release member being relieved of the depressing force so as to lock the transport.

According to this invention, film transport and shutter cocking are effected at the same time by a film winding action and the film is locked against transport at the overcocked position, without any possibility of rendering the shutter unreleasable. Upon completion of the shutter operation by shutter release, the release member is locked to preclude any accidental depression of the shutter button.

Other objects and features of this invention will become more apparent from the following description.

DESCRIPTION OF THE PREFERRED EMBODIMENTS

Figure 2:
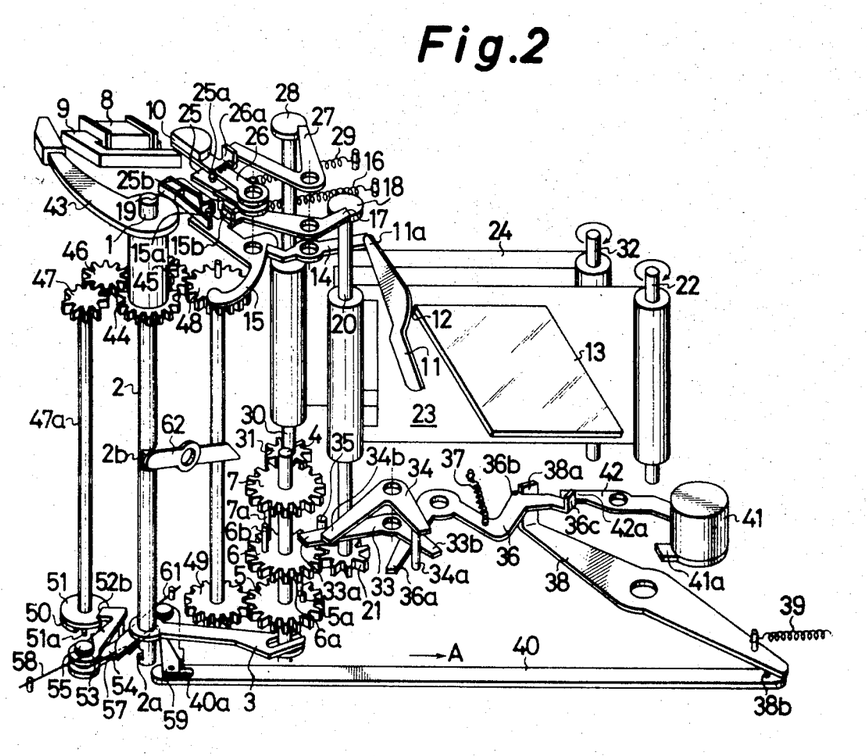
FIG. 2 is a perspective view showing the mechanism of an embodiment of this invention.

FIG. 2 shows an embodiment of this invention in which the parts are shown after the film has been wound up. Depression of a shutter button 1 in the illustrated state pushes down a release member 2 supporting the shutter button 1, whereby a forked plate 3 fixedly mounted on the member 2 is moved down. The forked plate 3 has a forked end in engagement with a clutch gear 5 supported on a shaft 4 in upwardly and downwardly movable manner. When moved down, the forked plate 3 also moves down the clutch gear 5. The shaft 4 further carries gears 6 and 7. A pin 6a projecting from the under face of the gear 6 is positioned in the path of rotation of a pin 5a on the clutch gear 5. When the clutch gear 5 is in the illustrated position before the downward movement, the pin 5a is in engagement with the pin 6a. The gear 6 has a pin 6b on its upper face. A pin 7a extending from the under face of the gear 7 is positioned in the path of rotation of the pin 6b and is engageable with the pin 6b. Accordingly, when the clutch gear 5 is driven in a clockwise direction by a shutter cocking operation to be described later, the pins 5a, 6a, 6b and 7a cause the gears 6 and 7 to rotate to cock the shutter. The downward movement of the clutch gear 5 frees the pin 6a from engagement with the pin 5a, rendering the gear 6 rotatable in a counterclockwise direction. The counterclockwise rotation of the gear 6 permits the gear 7 to rotate in a counterclockwise direction.

The downward movement of the clutch gear 5 causes an unillustrated operating member to close a power switch (not shown) of an electromagnetic winding 8 to apply current to the winding and energize an electromagnet 9, which in turn attracts an attractable piece 10. This causes unillustrated known means to move a mirror lever 11 in a counterclockwise direction to urge a reflecting mirror 13 upward in the same direction about a pin 12.

Immediately before the counterclockwise rotation of the mirror lever 11 is completed, an end 11a of the mirror lever 11 turns an initiating lever 14 in a counterclockwise direction to release a switch lever 15 from the lever 14.

When thus released, the switch lever 15 is urged in a clockwise direction by a spring 16. A lug 15b of the lever therefore pushes a first blind latch lever 17 in a clockwise direction out of engagement with a first blind retainer plate 18. At the same time, a pin 15a made of an electrically insulating material actuates a trigger switch 19. As well known, the trigger switch 19 is included in an exposure time controlling electric circuit for automatically controlling exposure by controlling the energizing time of the electromagnet 9. The actuation of the switch initiates charging of a capacitor which is one of the control elements of the circuit.

The first blind retainer plate 18 is fixed to a shaft 20 which fixedly carries a first blind gear 21 meshing with the gear 6. The retainer plate 18 is rotated in a counterclockwise direction by a shutter cocking operation to wind up a first blind 23 on the shaft 20 and is latched by the lever 17, with an unillustrated spring in the shaft 22 tensioned by the shaft 22.

Thus when the first blind latch lever 17 releases the retainer plate 18, the force of the spring within the shaft 22 rotates the shaft 22 in a clockwise direction to wind up the blind 23 since pins 5a and 6a on the gears 5 and 6 are out of engagement with each other. With this movement, the retainer plate 18 and the gear 21 rotate in a clockwise direction to rotate the gear 6 counterclockwise. In this way, the first blind 23 travels to open the shutter.

Even when the aforementioned clockwise rotation of the switch lever 15 permits the lug 15b to release a pin 25b on an overcocking lever 25 and thereby frees the lever 25 from mechanical retention by the lever 15, a pin 25a on the lever 25 is retained in engagement with a second blind release lever 26 while the attractable piece 10 on the release lever 26 is attracted to the electromagnet 9. Thus the lever 26 is in engagement with the overcocking lever 25 to retain a second blind 24 against travel and prevent a shutter closing action.

When the voltage across the capacitor reaches a trigger voltage, the aforesaid control circuit interrupts current supply to the electromagnetic winding 8 to deenergize the electromagnet 9 and free the attractable piece 10 from its attraction, whereupon a spring 29 forces the lever 25 to push the release lever 26 in a clockwise direction through the pin 25a in engagement with the lever 26. The release lever 26 in turn pushes a second blind latch lever 27 in a clockwise direction by its lug 26a to release a second blind retainer plate 28 from the lever 27.

The second blind retainer plate 28 is fixedly mounted on a shaft 30 which also fixedly carries a rear blind gear 31 meshing with the gear 7 and is rotated counterclockwise by a shutter cocking operation to wind up the second blind 24 on the shaft 30 and at the same time tensions an unillustrated spring housed in a shaft 32 by means of the shaft 32. The plate 28 is adapted to be engaged by the latch lever 27.

When the retainer plate 28 is freed from the engagement at its cocked position, the shaft 32, spring-biased in a clockwise direction, winds up the second blind 24 to travel the same and thereby close the shutter as in the case of the first blind 23. In operative relation to this movement, the shaft 30, retainer plate 28 and gear 31 rotate in a clockwise direction to rotate the gear 7 counterclockwise.

The gear 6 which rotates in a counterclockwise direction by virtue of the foregoing travel of the first blind 23 brings the pin 6b thereon into engagement with the tail end 33a of a first lever 33 immediately before the first blind 23 completes its travel, causing the lever 33 to move slightly in a clockwise direction. Consequently, the front end 33b of the lever 33 comes into engagement with a pin 34a extending from the front end of a second lever 34 and thereby moves the lever 34 in a clockwise direction, with the result that the tail end 34b thereof is brought to the path of movement of the pin 7a on the gear 7. The first lever 33 is stopped by a stopper 35.

The gear 7 which rotates in a counterclockwise direction by virtue of the foregoing travel of the second blind 24 brings the pin 7a into engagement with the tail end 34b of the second lever 34 just before the second blind 24 completes its travel which tail end has been brought to the aforementioned position by the travel of the first blind 23, whereby the lever 34 is further rotated clockwise, permitting the pin 34a on its front end to push the tail end 36a of the unlocking lever 36 against the action of a spring 37 and to thereby turn the lever 36 in a clockwise direction. An auxiliary unlocking lever 38 having a bent end 38a in engagement with a stepped portion 36b of the lever 36 is therefore released and rotates in a counterclockwise direction under the action of a spring 39 and unlocks a film transport lock through a link plate 40 to which the lever 38 is connected by a pin 38b.

When the control circuit operates normally, the camera mechanism will operate in the foregoing manner. If the power source battery has been drained however, little or no current will flow through the electromagnetic winding 8 even if the main switch is closed by depressing the shutter button 1, with the result that the electromagnet 9 will not have sufficient attraction to retain the attractable piece 10 in contact therewith. Consequently, when the first blind latch lever 17 is driven clockwise to unlatch the first blind retainer plate 18 by the switch lever 15 in operative relation to the jumping up of the mirror 13, the overcocking lever 25 is simultaneously freed from mechanical retention by the switch lever 15, permitting the spring 29 to rotate the lever 25 in a clockwise direction along with the second blind release lever 26 and second blind latch lever 27 so as to release the second blind retainer plate 28. As a result, the first and second blinds 23 and 24 travel at the same time and the shutter will not be opened.

Due to the simultaneous travel of the first and second blinds 23 and 24, the gears 6 and 7 meshing with the gears 21 and 31 respectively rotate together, with the pins 6b and 7a thereon in engagement with each other. Although the pin 6b will normally engage with the tail end 33a of the first lever 33 to rotate the lever 33 in a clockwise direction, causing the front end 33b thereof to push the pin 34a on the second lever 34 and thereby bring the tail end 34b of the second lever 34 to the path of movement of the pin 7a, the pin 7a moving around along with the pin 6b passes the intended position of the tail end 34 just before it is brought to this position. Consequently, the pins 6b and 7a are brought to a position between the tail ends 33a and 34b of the levers 33 and 34, so that the pin 7a prevents the clockwise rotation of the second lever 34 without permitting the pin 34a to engage with the unlocking lever 36. Thus, the auxiliary unlocking lever 38 remains in engagement with the lever 36, with the transport lock retained in locked state. It is therefore impossible to perform the next film winding operation.

To overcome such situation to be experienced if the battery gets consumed, there is provided a battery case 41 which is rotatable from outside and which has a projection 41a so that the unlocking lever 36 can be operated by the projection 41 through a release lever 42. Thus clockwise rotation of the battery case 41 causes the projection 41a to push the release lever 42 toward a counterclockwise direction, allowing its end 42a to push a lug 36c of the lever 36 and rotate the lever 36 clockwise. The auxiliary unlocking lever 38 is therefore released to unlock the film transport lock.

The transport lock will be described later.

When a winding lever 43 is turned in counterclockwise direction after the shutter has been tripped and the transpprt lock has been unlocked, a gear 44 associated with the winding lever 43 by means of an unillustrated ratchet rotates a spool-associated gear 47 and a sprocket gear-associated 48 through gears 45 and 46 to rotate a spool and sprocket and wind up the unillustrated film. At the same time, the cluch gear 5 is rotated in a clockwise direction through a gear 49 which is coaxial with the gear 48 for rotation therewith. As a result, the gears 6 and 7 are driven together through the pins 5a, 6a, and 7a to rotate the first and second blind gears 21 and 31 in a counterclockwise direction.

The counterclockwise rotation of the gears 21 and 31 further rotates the shafts 20 and 30 and first and second blind retainer plates 18 and 28 to wind up the first and second blinds 23 and 24 on the shafts 20 and 30 respectively, while tensioning the springs within the shaft 22 and 32. The shutter cocking operation completes upon the engagement of the latch levers 17 and 27 with the retainer plates 18 and 28 respectively.

In the foregoing embodiment, the film transport lock and safety lock for the shutter button have the following construction.

A first notched disc 50, a rotary member, is coaxial with the spool-associated gear 47 for rotation therewith. Positioned on the notched disc 50 is a second notched disc 51 serving as a driven member and having an outer diameter slightly greater than that of the disc 50, the disc 51 being rotatable about a shaft 47a. The discs 50 and 51 are formed with locking notches 52a and 52b respectively. The first disc 50 has another notch 50a other than the notch 52a for receiving a pin 51a extending from the second notched disc 51 so as to limit the rotation of the second notched disc 51 relateve to the first disc 50 to a given range, the arrangement being such that the second notched disc 51 follows the rotation of the first disc 50 during the winding operation, with the edges of the notches 52a and 52b in registry with each other in the circumferential direction. The limited range difined by the notch 50a and pin 51a is such that after both discs 50 and 51 have rotated to an overcocked position upon completion of the winding operation, the first notched disc 50 is allowed to rotate reversely by the overcocked amount, with the second notched disc 51 in stationary state.

A transport lock lever 53, a constituent of an engageable member, has at its one end a lock pawl 53a engageable in and disengageable from the notches 52a and 52b of the discs 50 and 51. A shutter button lock lever 54, another constituent of the engageable member, is formed at its one end with a lock pawl 54a engageable in and disengageable from a release lock portion 2a in the lower end of the release member 2. Both levers 53 and 54 are pivoted as at 55 to a camera body 56 and connected together by a spring 57 acting to pivotally move the levers 53 and 54 together. A rear portion 54b of the lever 54 is elestically in contact with a pin 53b on the lever 53.

A spring 58 somewhat stronger than the spring 57 acts on the transport lock lever 53 in such direction that the pawl 53a of the lever 53 will be disengaged from the notches 52a and 52b of the discs 50 and 51.

A locking effecting lever 59 pivoted at 60 on the camera body 56 has one end 59a in engagement with the pin 53b on the lock lever 53 and the other end carrying a pin 59b engaged in a slot 40a in an end of a link plate 40. A spring 61 is provided on the lever 59 to urge the lock lever 53 in such direction that its pawl 53a will engage in the notches 52a and 52b of the discs 50 and 51 in operative relation to the shutter cocking operation. The spring 61 exerts a force greater than the sum of the forces of the springs 57 and 58 but lower than the force of the spring 39 acting on the auxiliary unlocking lever 38, the spring 61 acting in the opposite direction with respect to the spring 39.

Figure 3:
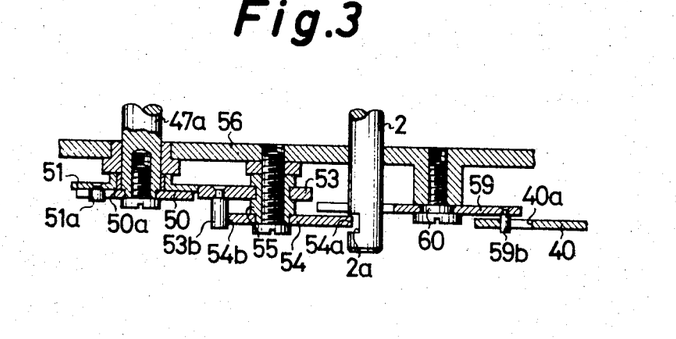
FIG. 3 is a development in section showing the principal part of the embodiment of FIG. 2.

FIG. 3 is a development in vertical section showing the lock mechanism of the FIG. 2. FIGS. 4 to 8 show the same as seen from the under side of the mechanism shown in FIG. 2.

When film transport is completed, the auxiliary unlocking lever 38 has its bent end 38a engaged by the unlocking lever 36, so that the locking effecting lever 59 under the action of the spring 61 pushes the pin 53b of the lock lever 53 against the action of the spring 58, bringing the pawl 53a of the lever 53 into engagement with notches 52a and 52b of the first and second discs 50 and 51 for locking, while, at the same time, permitting the shutter button lock lever 54 to follow the movement of the lock lever 53 under the action of the spring 57 to disengage its pawl 54a from the release lock portion 2a. The shutter button 1 can therefore be depressed (see FIGS. 2 and 4).

Figure 5:
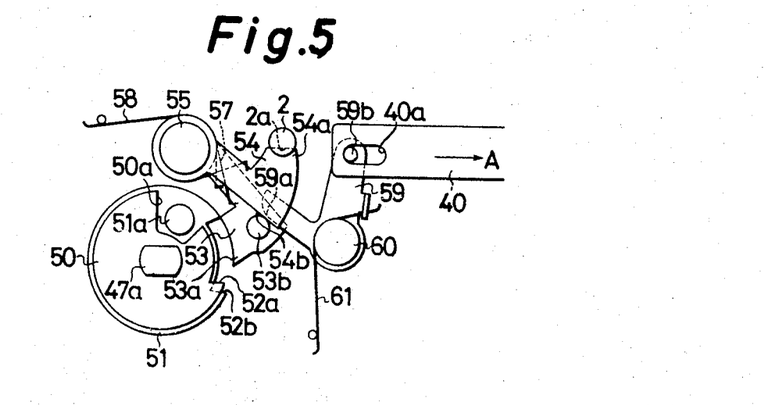

Upon completion of shutter release through the depression of the shutter button 1, the auxiliary unlocking lever 38 moves pivotally out of engagement with the unlocking lever 36 under the spring 39 to move the link plate 40 in the direction of the arrow A in FIGS. 2 and 5, whereby locking effecting lever 59 having a pin 59 engaged in the slot 40a in the link plate 40 is moved pivotally against the action of the spring 61. Accordingly, the transport lock lever 53 under the action of the spring 58, follows the movement of the locking effecting lever 59 to disengage its pawl 53a from the notches 52a and 52b and, at the same time, to cause its pin 53b to push the rear portion 54b of the shutter button lock lever 54. Thus the pawl 54a engages in the release lock portion 2a of the release member 2 to permit film transport and lock the shutter button 1 against depression(see FIG. 5).

In the case where the power source battery has been consumed, the first and second blinds 23 and 24 will travel at the same time and the transport lock will not be unlocked as already described, but the battery dase 41, when rotated, frees the auxiliary unlocking lever 38 to move the link plate 40 in the direction of arrow A, with the result that the transport lock will be freed and the shutter button will be locked in the same manner as above.

When the winding lever 43 is turned for film transport, the first and second blinds 23 and 24 are wound up at the same time as already described. At the final stage of this movement, an unillustrated cocking lever moves the auxiliary unlocking lever 38 in a clockwise direction (see FIG. 2) against the force of the spring 39 to bring the same into engagement with the unlocking lever 36 which is urged by the spring 37 in a counterclockwise direction. This movement of the lever 38 brings the link plate 40 in the position of FIG. 5 to the position of FIG. 6 as indicated by the arrow B.

Further the rotation of the spool associated gear 47 rotates the first notched disc 50 mounted on the same shaft 47a and the second notched disc 51 superposed on the disc.

The movement of the link plate 40 in the direction of the arrow B renders the locking effecting lever 59 rotatable under the action of the spring 61, permitting the lever 59 to urge the transport lock lever 53 with its one end 59a in such direction that the pawl 53a will engage in the notches 52a and 52b. At this time, however, the first and second discs 50 and 51 have already been initiated into rotation by virtue of rotation of the spool associated gear 47. Consequently, the pawl 53a is brought into contact with the outer periphery of the second disc 51 but is prevented from engaging into the notches 52a and 52b, the pawl 53a thus acting on the second notched disc 51 as a braking member. More specifically, the lock lever 53, locking effecting lever 59 and spring 61 serve as braking means for the second disc.

Figure 6:
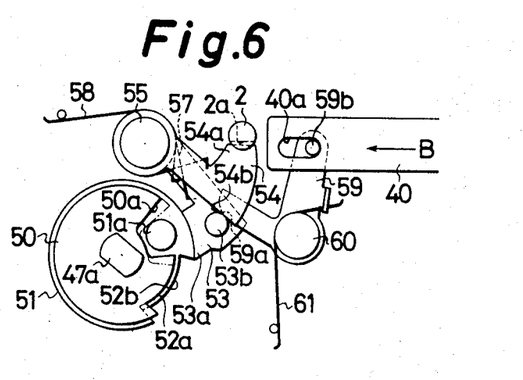

The second notched disc 51 follows the disc 50 to rotate thereon and is braked by the frictional force due to the contact of the pawl 53a with its outer periphery, but when the notched edge 50a of the first disc 50 rotating by virtue of the winding operation comes into contact with the pin 51a as indicated in the phantom line in FIG. 6, the first disc 50 overcomes the frictional force and rotates the second disc 51.

When the notches 52a and 52b come to a position where the pawl 53a of the transport lock lever 53 is engageable in the notches (the shutter is already in an overcocked position, with the film completely wound up), the spring 61 acting on the locking effecting lever 59 brings the pawl 53a of the locking lever 53 into the notches 52a and 52b to prevent the discs 50 and 51 from rotation for transport locking. At the same time, the shutter button lock lever 54 follows this movement under the action of the spring 57 to cause its pawl 54a to disengage from the release lock portion 2a of the release member 2, rendering the shutter button 1 depressible.

Figure 4:
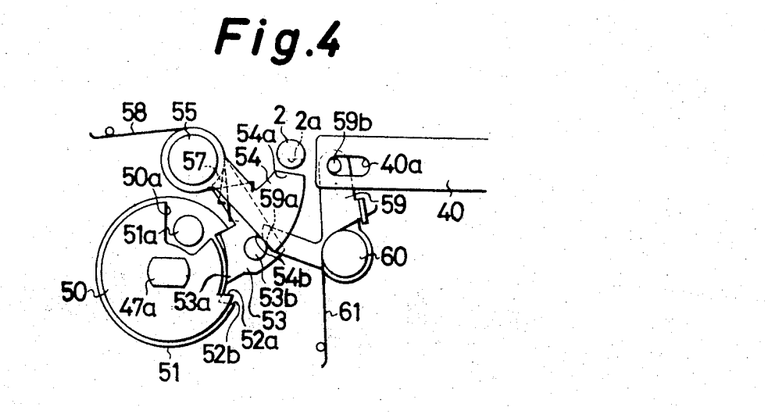
FIGS. 4 to 8 are views illustrating the operation of principal part of the same as it is seen from its under side.

When the winding lever 43 is relieved of the operating force in this state, the spool-associated gear 47 and the first notched disc 50 rotate in the reverse direction by the overcocked amount and the sprocket-associated gear 48 and the group of gears 49, 5, 6, 7, 21 and 31 also rotate reversely, with the latch levers 17 and 27 brought into engagement with the first and second blind retainer plates 18 and 28. The second disc 51 does not rotate reversely at this time. The parts are therefore in the film wound-up position as illustrated in FIG. 2 and 4.

Figure 7:
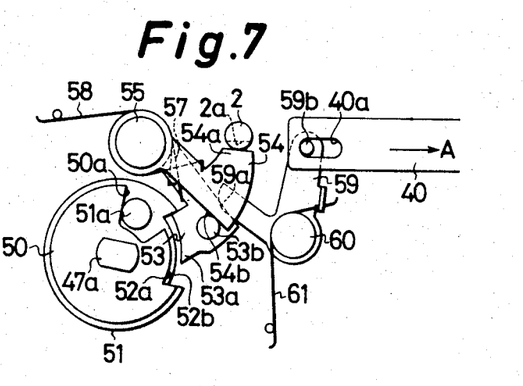

FIG. 7 illustrates the parts as the shutter button 1 has been depressed upon shutter release. In this state, it is impossible to transport the film. The movement of the link plate 40 in the direction of the arrow A subsequent to the tripping of the shutter moves the locking effecting lever 59 in a clockwise direction (FIG. 7) against the action of the spring 61, rendering the pawl 53a disengageable from the notches 52a and 52b of the discs 50 and 51 under the action of the spring 58, but the pawl 54a of the shutter button lock lever 54 contacts the outer face of the release member 2 and is prevented from further movement, with the result that the lever 54 in contact with the pin 53b retains the lock lever 53 against the action of the spring 58. Thus the pawl 53a is prevented from disengagement from the notches 52a and 52b.

Figure 8:
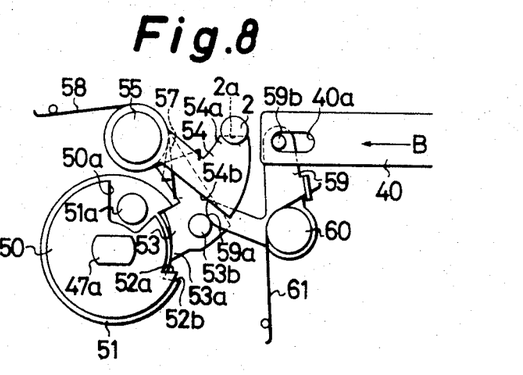

FIG. 8 illustrates a case in which the self-timer has been erroneously initiated into operation prior to the transport of film when it is used for taking a photograph. If the unillustrated self-timer is operated before the film is wound up, the depressing force is delivered to the release member 2 through a self-timer actuating lever 62, causing the end face of the release lock portion 2a to press the pawl 54a of the shutter button lock lever 54 to prevent the pawl from disengagement from the lock portion 2a. The self-timer of course stops at the position where the pawl 54a is pressed.

When the film is wound up in this state, the link plate 40 moves in the direction of the arrow B, forcing the locking effecting lever 59 to move pivotally under the action of the spring 61 to urged the pawl 53a toward the notches 52a and 52b against the spring 58. Although the shutter button lock lever 54 is held against rotation with its pawl 54a pressed by the release lock portion 2a under the action of the self-timer, the lock lever 53 can be pivotally moved by the locking effecting lever 59 with the force of its spring 61 against the springs 57 and 58, inasmuch as the lever 53 and lever 54 are operatively connected together by the spring 57. Accordingly, even if the shutter button lock lever 53 is held arrested by the release member 2, it is possible to wind up the film. When turned to the overcocking position, the winding lever 43 causes the pawl 53a of the lever 53 to brake the second notched disc 51 as already described, followed by the conjoint rotation of the first and second discs 50 and 51 to permit the pawl 53a to engage in the notches 52a and 52b to lock the transport. The parts are now positioned as illustrated in FIG. 8.

When the film is locked in this way, the self-timer will be cocked again. If the release member 2 is relieved of the depressing force acting thereon through the lever 62, the spring 57 brings the pawl 54a out of engagement with the release lock portion 2a to unlock the shutter button. When actuated, the self-timer will release the shutter to take a photograph.

Figure 9:
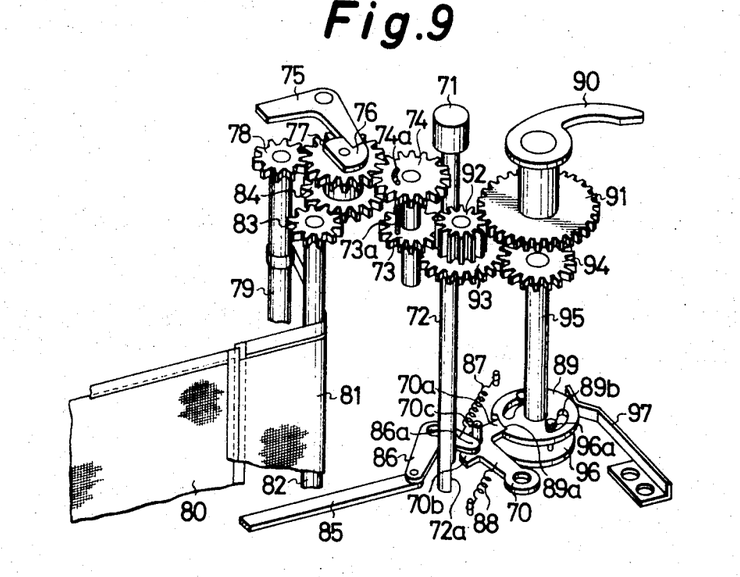
FIG. 9 is a perspective view showing the mechanism of another embodiment of this invention.

The engageable member for the transport lock consisting of the transport lock lever 53 and the shutter button lock lever 54 in the foregoing embodiment may alternatively comprise one engageable member 70 having a transport lock pawl 70a and a shutter button lock pawl 70b as shown in FIG. 9.

FIG. 9 shows the parts when the film transport and shutter cocking have been completed. Depression of a shutter button 71 causes a release member 72 and a clutch gear 73 to move down, with its pin 73a disengaged from an arcuate window 74a in a gear 74 to free the gear 74. Unillustrated means then moves a first blind latch lever 75 in a counterclockwise direction to release a first blind retainer plate 76 which is fixedly mounted on a first blind gear 77. The gear 77 meshes with a gear 78 which is secured to a shaft 79 for winding a first blind 80.

Accordingly, the disengagement of the first blind retainer plate 76 from the latch lever 75 allows the first blind 80 to be wound on an unillustrated shaft by the force of a spring housed in the shaft to open the shutter.

By being wound up on a shaft 82, a second blind 81 tensions a spring in an unillustrated shaft. A gear 83 mounted fixedly on the shaft 82 meshes with a second blind gear 84 which is adapted to be retained in cocked position by the engagement of unillustrated latch lever with a second blind retainer plate. As in the embodiment of FIG. 2, the second blind is freed from the retention by the second blind latch lever under the control of an unillustrated exposure control electric circuit energized upon the initiation of travel of the first blind or upon the lapse of a predetermined exposure time. The second blind is therefore wound up on the spring-incorporating shaft to travel and thereby close the shutter.

Figure 10:
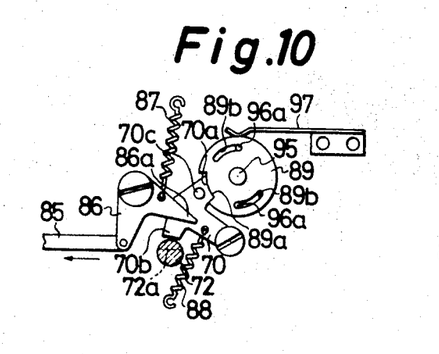
FIGS. 10 to 13 are views illustrating the operation of principal part of the same as it is seen from above.

In operative relation to the shutter release, unillustrated means urges a link plate 85 leftward to move a locking effecting lever 86 in a clockwise direction against the action of its spring 87. In contact with an end 86a of the locking effecting member 86 is a pin 70c on the engageable member 70 urged in a counterclockwise direction by a spring 88 which is weaker than the spring 87. Consequently, the engageable member 70 tends to follow the clockwise movement of the lever 86 for counter clockwise rotation. However, while the release member 72 is in its depressed position, the pawl 70b of the engageable member 70 cannot engage in a release lock portion 72a of the release member 72 but contacts the outer face of the release member 72 as seen in FIG. 10, with the result that the pawl 70a remains in engagement with a notch 89a in a notched disc 89. Therefore, the disc 89 is retained against rotation to impede a film winding operation.

Figure 11:
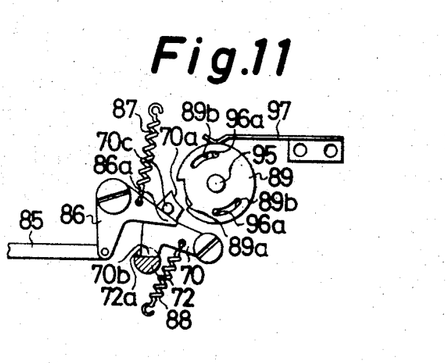

When the shutter button 71 is freed from the hand, an unillustrated return spring returns the shutter button 71, release member 72 and clutch gear 73 upward, permitting the clutch gear 73 to engage with the gear 74 through the pin 73a. The upward movement of the release member 72 positions the release lock portion 72a into the path of movement of the pawl 70b, so that the engageable member 70 moves counterclockwise and engages the pawl 70b in the release lock portion 72a under the action of the spring 88, with the pawl 70a disengaged from the notch 89a of the disc 89. The parts are now positioned as seen in FIG. 11. In this state, the film can be wound up but the shutter button is locked against inadvertent depression.

A winding lever 90 rotates the clutch gear 73 through gears 91 and 92 when winding the film and cocks the shutter through the operatively associated mechanism including the gears 74, 77, 78, 84 and 83. The film is wound up by rotating the gear 93, spool-associated gear 94, unillustrated sprocket-associated gear, etc. The transport of the desired length of film is completed by the shutter cocking member being rotated to an overcocked position.

The spool-associated gear 94 rotates with a rotary member 96 on a spool shaft 95. The notched disc 89, a driven member, is positioned above the rotary member 96, and pins 96a on the rotary member 96 engage in arcuate windows 89b of the notched disc 89, the disc 89 thus being rotatable by the pin 96a. The arcuate window 89b has such circumferential length that even when the rotary member 96, driven to the overcocked position by the film transport, is reversely rotated by the overcocked amount, the notched disc 89 will remain stationary, permitting the reverse rotation of the rotary member 96. A braking member 97 made of a spring material bears against the outer periphery of the disc 89 elastically to frictionally brake its rotation so as to retain the disc 89 in its overcocked position against reverse rotation in spite of the reverse rotation of the rotary member from its overcocked position. to When the winding lever 90 is turned in a counterclockwise direction as the parts are rendered operable for film transport as seen in FIG. 11, the shutter will be cocked as already described, while the rotary member 96 rotates in a counterclockwise direction along with the spool shaft 95 to wind up the film. Despite the initiation of rotation of the rotary member 96, the notched disc 89 which is brake by the braking member 97 will not start to rotate immediately. After each of the pins 96a on the rotary member 96 has moved from one end of the arcuate window 89b to the other end thereof, namely after the rotary member 96 has rotated through an amount corresponding to the play between the windows 89b and pins 96a, the disc 89 is driven by the rotary member 96 through the pins 96a. Accordingly, even if the rotary member 96 makes one turn of rotation, the notched disc 89 does not rotate one turn but the notch 89a is shifted from the position of FIG. 11 only to the position of FIG. 12. In this state, the shutter has been completely cocked and, through rotation of the rotary member 96, the parts are overcocked. Upon completion of film transport, the rotary member 96 will be driven in the reverse direction.

Figure 12:
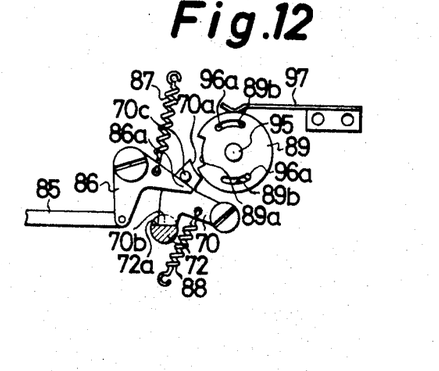

Upon completion of the shutter cocking operation as illustrated in FIG. 12, the link plate 85 is freed from the unillustrated means which retains the same at the left-hand position and rendered movable rightward under the action of the spring 87 acting on the locking effecting lever 86. Consequently, the end 86a of the lever 86 bears against the pin 70c on the engageable member 70, urging the member in a clockwise direction. However, the transport lock pawl 70a contacts the outer periphery of the disc 89 inasmuch as the notched disc 89 is still in the position of FIG. 12. Thus the member 70 is impeded from further clockwise drotation.

Figure 13:
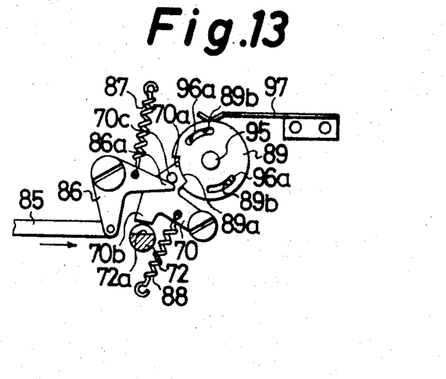

Further counterclockwise movement of the winding lever 90 through an angle corresponding to the overcocking amount brings the notch 89a of the disc 89 into the path of movement of the transport lock pawl 70a as seen in FIG. 13, whereupon the pawl 70a engages in the notch 89a under the action of the spring 87 to lock the transport.

Before this state is achieved, the shutter button lock pawl 70b remains in engagement with the release lock portion 72a of the release member 72 to prevent the depression of the shutter button 71. Since the parts illustrated in FIG. 13 are in the overcocked state, the mechanism is free of such objection that the shutter will be released immediately before the completion of the film transport.

When the winding lever 90 shown in the FIG. 13 is relieved of the operating force, the group of gears and the rotary member 96 are reversely rotated by the overcocked amount and are returned to the state of FIGS. 9 and 10. As a result, the pins 96a on the rotary member 96 are returned from the position of FIG. 13 to that of FIG. 10. The shutter is therefore releasable.

It will be experienced that the shutter button 71 is depressed without winding up the film, causing the end face of the release lock portion 72a of the release member 72 to arrest the shutter button lock pawl 70b of the engageable member 70 in pressing contact therewith, with the result that the engageable member 70 is prevented from clockwise rotation (i.e. from film transport locking action) upon the transport of film. Such situation will be experienced when the self-timer is actuated prior to film transport.

If the film is wound up in such case, the rotary member 96 will rotate in a counterclockwise direction, with the engageable member 70 retained in the position of FIG. 11, and drive the disc 89 through the pins 96a. Even when the link plate 85 is freed from the retention at the left-hand position upon the the rotary member 96 reaching the position of FIG. 12, the lever 86 cannot move the engageable member 70 inasmuch as the arresting force on the engageable member 70 is greater than the force of the spring 87. Through further movement of the winding lever 90 in the winding direction, the rotary member 90 and the notched disc 89 reach the overcocked position shown in FIG. 13 and stop to complete film transport. The engageable member 70, however, is still retained by the release member 72, with the transport lock pawl 70a prevented from entering the notch 89a.

When the winding lever 90 is freed from the operating force, the parts return in the reverse direction by the overcocked amount as already described. At this time, the notched disc according to the conventional construction will also rotate reversely, whereas in the case of this embodiment, the notched disc 89 is braked by the braking member 97. Since there is play between the notched disc 89 and the rotary member 96 which corresponds to the overcocked amount of the rotary member 96, the disc remains in the stationary position of FIG. 13 despite the reverse rotation of the rotary member 96, the transport lock pawl 70a thus being engageable in the notch 89a.

If the depressing force acting on the shutter button 71 and release member 72 is removed upon completion of the winding operation as by cocking the self-timer again, the engageable member 70 will be freed from the release member 72, so that the transport lock pawl 70a will engage in the notch 89a of the disc 89 to lock the transport. At the same time, the shutter can be released since the lock pawl 70b is out of engagement with the release lock portion 72a.

FIGS. 14 to 17 show a ratchet gear 89' corresponding to the notched disc 89 in the foregoing embodiment. It is provided as a driven member adapted to follow a rotary member which rotates in operative relation to a film winding action. In the same manner as in FIG. 9, the gear 89' is mounted above the unillustrated rotary member and is formed with a notch 89a. Instead of the aforementioned braking member 97, there is provided a ratchet pawl 101 urged by a spring 100 in in a counterclockwise direction and having a distal end in engagement with the ratchet gear 89', the arrangement being such that during the film winding operation, the pqwl 101 brakes the gear 89' and latches the same at the position where winding is completed against reverse rotation. The parts similar to those of FIG. 9 are referred to by the same numerals.

Figure 14:
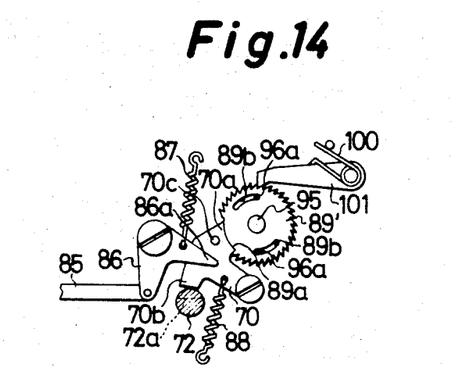
FIGS. 14 to 17 are views illustrating the operation of principal part of another modified embodiment as it is seen from above.

FIG. 14 shows a release member 72 as it is depressed by shutter release. In this state, an engageable member 70 is unable to move out of the notch 89a even if a locking effecting lever 86 is moved in a clockwise direction, hence it is impossible to wind up the film.

Figure 15:
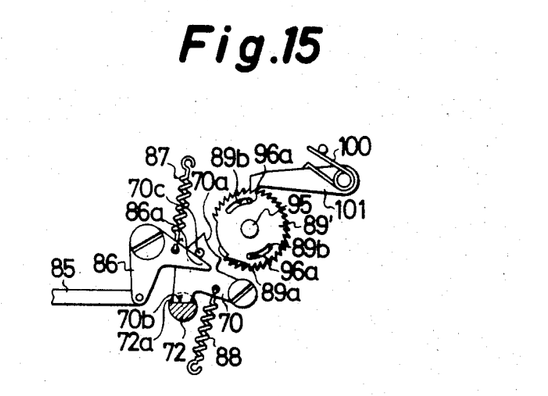
Figure 16:
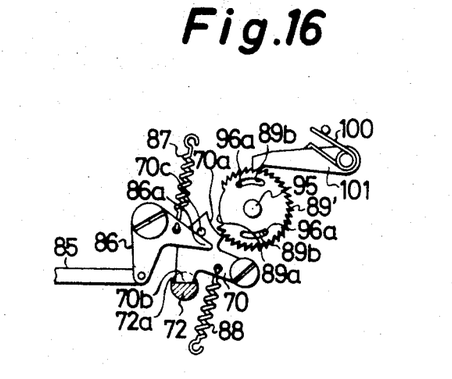

When the shutter button (not shown) is freed from the hand, the release member will return upward, permitting the engageable member 70 to bring its lock pawl 70b into a release lock portion 72a of the release member 72. Thus, the film can be wound up and the shutter button (release member) will be locked.

When a film winding operation is performed in the state of FIG. 15, the shutter will be cocked (see FIG. 9), while the pins 96a on the unillustrated rotary member which rotates along with a spool shaft 95 bring the ratchet gear 89' into rotation in the course of rotation by virtue of engagement in the arcuate windows 89a. During rotation, the ratchet gear 89' is subjected to a braking action by the pawl 101 (see FIG. 16). Upon completion of the shutter cocking operation, the link plate 85 is freed from retention at the left-hand position by means of unillustrated means, whereupon the locking effecting lever 86 moves counterclockwise direction under the action of the spring 87 and urges the engageable member 70 in a clockwise direction.

Figure 17:
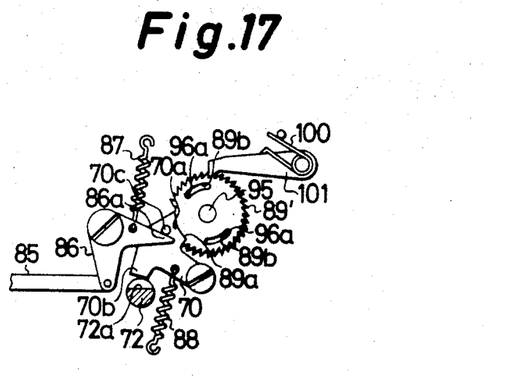

Through further winding operation, the pawl 70a of the engageable member 70 engages in the notch 89a as seen in FIG. 17 to lock the transport.

If a film winding operation is performed in the state of FIG. 15 in which the release member 72 is subjected to a depressive force, with the engageable member 70 arrested by the release lock portion 72a against clockwise rotation, the engageable member 70 will be unable to cause its pawl 70a to engage in the notch 89a even when the ratchet gear 89' reaches the locking position. Further if the winding lever is relieved of the operating force in this state, the rotary member rotates reversely in a clockwise direction along with the spool shaft 95, whereas the ratchet gear 89' is positively prevented from reverse rotation by the pawl 101 in engagement therewith. Accordingly, if the release member 72 is freed from the depressive force after the winding operation, the engageable member 70 will be freed from the member 72 and moved clockwise by the locking effecting lever 86 under the action of the spring 87. As a result, the transport lock pawl 70a will engage in the notch 89a with the pawl 70b disengaged from the release lock portion 72a. The shutter is therefore rendered releasable.

Although the present invention has been described with reference to embodiments in which the shutter release member is adapted to be locked in operative relation to the travel of the second blind, it will be apparent that such locking action can be effected in relation to the travel of the first blind, reflecting mirror operating means, diaphragm aperture operating means or the like. Such modifications of mechanism are all included within the scope of this invention insofar as they do not depart from the principle of this invention.

What is claimed is:

1. A safety apparatus for a shutter button in a camera comprising:
    a rotary member rotatable to an overcocked position by a film winding operation and reversely rotatable by the overcocked amount after completion of the winding operation,
    a driven member having a transport lock notch and supported on the rotary member, the driven member being rotatable with respect to the rotary member within such range as to permit the rotary member to rotate by the overcocked amount,
    a release member having a release lock portion and downwardly movable by a shutter release operation and upwardly returnable when relieved of the releasing force,
    an engageable member having a portion engageable in and disengageable from the transport lock notch and another portion engageable in and disengageable from the release lock portion, the engageable member being positioned with at least one of the engageable and disengageable portions in engagement with one of the notch and the release lock portion,
    means for urging the engageable member in a direction to force one of the engageable and disengageable portions to engage in the transport lock notch through the winding operation and in a reverse direction to force the other engageable and disengageable portion to engage in the release lock portion through the shutter release operation, the urging means including a spring acting on the engageable member in a direction to disengage one of the engageable and disengageable portions from the transport lock notch and to engage the other engageable and disengageable portion in the release lock portion and a locking effecting member urged by a spring stronger than the spring and acting on the engageable member in a direction reverse to the direction of action of the first-mentioned spring, the locking effecting member being movable in a diection away from the engageable member by the shutter release operation, and
    means for braking the driven member at least from an intermediate stage of the winding operation until the completion of the winding operation, the braking means being operable to retain the driven member at its transport lock position against reverse rotation upon the driven member reaching this position.

2. The safety apparatus as set forth in claim 1 wherein the engageable member comprises the combination of a transport lock lever and a shutter button lock lever, the transport lock lever having a pawl engageable in and disengageable from the transport lock notch and urged by the spring in a direction to disengage the pawl from the transport lock notch, the shutter button lock lever having a pawl engageable in and disengageable from the release lock portion and connected to the transport lock lever by a spring other than the aforementioned spring so as to follow the transport lock action, the locking effecting member including braking means for bringing its operation end into contact with the transport lock lever to urge the transport lock lever in a direction to engage its pawl in the transport lock notch through the winding operation so as to brake the rotation of the driven member, the transport lock lever being capable of engaging its pawl in the transport lock notch against the spring connecting the shutter button lock lever to the transport lock lever.

3. The safety apparatus as set forth in claim 1 wherein the means for braking the driven member is a braking member separately provided to brake the rotation of the driven member and the braking member prevents the driven member from rotating reversely from its overcocked position.

4. The safety apparatus as set forth in claim 3 wherein the engageable member comprises one member having a portion engageable in and disengageable from the transport lock notch and another portion engageable in and disengageable from the release lock portion.

5. The safety apparatus as set forth in claim 3 wherein the braking member is in elastic contact with the driven member to frictionally brake its rotation.

6. The safety apparatus as set forth in claim 3 wherein the means for braking the driven member comprises ratchet teeth formed in the driven member, a rachet pawl in engagement with the ratchet teeth so as to prevent the driven member from reversely rotating from its overcocked position and a spring member for urging the pawl into engagement with the ratchet teeth.

* * * * *

UNITED STATES PATENT OFFICE
CERTIFICATE OF CORRECTION

Patent No. 3,754,454            Dated August 28, 1973

Inventor(s) HIROSHI NAKAMURA and AKIO OKAMOTO

It is certified that error appears in the above-identified patent and that said Letters Patent are hereby corrected as shown below:

-- 30   Foreign Application Priority Data

February 1, 1973..............47-13782--

Attorney-- Stanley Wolder

Signed and sealed this 27th day of November 1973.

(SEAL)
Attest:

EDWARD M. FLETCHER, JR.          RENE D. TEGTMEYER
Attesting Officer                   Acting Commissioner of Patents